(12) United States Patent
Cates et al.

(10) Patent No.: US 8,508,721 B2
(45) Date of Patent: Aug. 13, 2013

(54) MULTIFUNCTION AIRCRAFT LIDAR

(75) Inventors: Michael C. Cates, Albuquerque, NM (US); Joseph Nolan Paranto, Albuquerque, NM (US); Ty Aaby Larsen, Everett, WA (US)

(73) Assignee: The Boeing Company, Chicago, IL (US)

( * ) Notice: Subject to any disclaimer, the term of this patent is extended or adjusted under 35 U.S.C. 154(b) by 471 days.

(21) Appl. No.: 12/543,330

(22) Filed: Aug. 18, 2009

(65) Prior Publication Data

US 2011/0043785 A1 Feb. 24, 2011

(51) Int. Cl.
*G01C 3/08* (2006.01)

(52) U.S. Cl.
USPC .......... 356/5.1; 356/3.01; 356/4.01; 356/5.01

(58) Field of Classification Search
USPC ............................................ 356/5.1, 28–28.5
See application file for complete search history.

(56) References Cited

U.S. PATENT DOCUMENTS

| | | | | |
|---|---|---|---|---|
| 3,866,055 | A * | 2/1975 | Pike | 250/564 |
| 4,168,908 | A * | 9/1979 | Cubalchini | 356/139.08 |
| 5,047,653 | A * | 9/1991 | Garcia et al. | 250/574 |
| 5,587,785 | A * | 12/1996 | Kato et al. | 356/28.5 |
| 5,859,694 | A * | 1/1999 | Galtier et al. | 356/28.5 |
| 6,320,272 | B1 * | 11/2001 | Lading et al. | 290/44 |
| 7,532,311 | B2 * | 5/2009 | Henderson et al. | 356/4.01 |
| 8,045,432 | B2 * | 10/2011 | Nishiwaki et al. | 369/53.12 |
| 2006/0227317 | A1 * | 10/2006 | Henderson et al. | 356/28 |
| 2010/0277714 | A1 * | 11/2010 | Pedersen et al. | 356/28 |

FOREIGN PATENT DOCUMENTS

| GB | 2 221 591 A | * | 8/1988 |
|---|---|---|---|
| GB | 2221591 A | | 2/1990 |

OTHER PUBLICATIONS

Vaughan, John M., Coherent Laser Radar in Europe, Proceeding of IEEE, vol. 84 No. 2, Feb. 1996.*
Russell, Targ. Lidar Wind Sensing at Cruise Altitude for Flight-Level Optimization, 98\SPIE vol. 2737, 0-8184-2188-9, 1996.*
Rabine, David L., Development and Test of Raster Scanning Laser Altimeter for High Resolution Airborne Measurements of Topography, IEEE, 0-7803-3068-4, 1996.*
Hansen, Rene Skov, Optical Mixing in Coherent LIDARs: Comparison Three Schemes, Applications of Photonic Technology 4, Rodger A. Lessard, Geroge A. Lampropoulos Editors, Proceedings in SPIE vol. 4087, 2000.*

(Continued)

*Primary Examiner* — Luke Ratcliffe
(74) *Attorney, Agent, or Firm* — Hope Baldauff, LLC

(57) ABSTRACT

A multifunction light detection and ranging (LIDAR) system for aircraft or other applications may use autodyne techniques. An autodyne system can use a single laser source and a single detector. The autodyne technique can mix two signal beams to produce a "beat note" at the frequency difference between the beams. Autodyne detection can leverage photon counting to support significantly reduced system complexity. Reduced complexity may provide solutions with significantly reduced power consumption, lighter weight, smaller volume, and lower cost. The multifunction LIDAR system can detect and identify regions of weather hazards such as lightning storms, aircraft wake vortex, clear air turbulence, and wind shear. The multifunction LIDAR system may also be configured to measure aircraft air and ground speed in multiple dimensions as well as aircraft altitude.

20 Claims, 10 Drawing Sheets

(56) References Cited

OTHER PUBLICATIONS

Fluckiger, D.U., Optical Autodyne Detection: Theory and Experiment, Applied Optics, vol. 26, No. 2, Jan. 15, 1987.*
D. Soreide, et al. article entitled, "Airborne Coherent Lidar for Advanced In-Flight Measurements (ACLAIM) Flight Testing of the Lidar Sensor," prepared for the American Meteorological Society Ninth Conference on Aviation, Range, and Aerospace Meteorology, Orlando, Florida, Sep. 11-15, 2000; 8 pages.
Russell Targ, et al article entitled, Lidar Wind Sensing at Cruse Altitude for Flight-Level Optimization, SPIE, vol. 2737, 1996, pp. 98-103; 6 pages.
Brian C. Redman and Barry L. Stann article entitled, "Photon-Counting Chirped Amplitude Modulation Ladar," published Jun. 1, 2009 at website: http://www.defensetechbriefs.com/component/contant/article/5327; 2 pages.
International Search Report and Written Opinion dated Jan. 21, 2011 in PCT/US2010/042973.

* cited by examiner

MULTIFUNCTION AIRCRAFT LIDAR

BACKGROUND

Traditional RADAR is leveraged by aircraft to identify terrain, weather hazard regions, and other environmental factors. Weather RADAR can detect the motion of large scattering particles such as rain, snow, or hail. These larger particles can provide the reflective ranges for determining regions of turbulence or wind shear. RADAR systems dependent upon these larger particles may be insensitive, or blind, to atmospheric phenomena containing small particles. For example, regions of clear air turbulence, building thunderstorms, or decaying thunderstorms are not detected by such RADAR systems.

Light detection and ranging (LIDAR) techniques may be used to measure properties of scattered light. However, traditional LIDAR systems are based upon coherent heterodyne LIDAR techniques. Coherent heterodyne LIDAR requires a reference laser referred to as the local oscillator (LO). In heterodyne systems, light from the LO is mixed with the signal returned from the scattering medium or atmosphere. A frequency of the resultant heterodyne signal is compared to the expected frequency which is the difference between the transmitter and the LO. The difference between the measured and expected frequency is the target Doppler shift which is proportional to the target velocity. Thus, the heterodyne solution must maintain and carefully control the frequency offset between the transmitter and LO in order to accurately calculate the target Doppler shift to determine the velocity.

Controlling this frequency offset is generally a challenge. For example, the transmitter laser frequency may be measured and controlled to compensate for LO laser drift, also the frequency offset between the transmitter and the LO may be measured and tracked for each measurement firing of the laser. Frequency offset control may often involve phase locked loop (PLL) electronics and various other complex techniques. In addition to the second laser source for generating an LO signal, frequency offset control techniques generally require complex, heavy, power-hungry, and expensive components to be deployed as part of the LIDAR system.

SUMMARY

It should be appreciated that this Summary is provided to introduce a selection of concepts in a simplified form that are further described below in the Detailed Description. This Summary is not intended to be used to limit the scope of the claimed subject matter.

According to aspects of the technology disclosed herein, a multifunction LIDAR system can include a transmitter configured to generate an optical beam and an optical splitter configured to generate two measuring beams from the optical beam. Two return beams may be generated by reflecting the two measuring beams off of a subject medium. The two return beams may be combined to generate an autodyne beam. A detector may be configured to receive the autodyne beam. A signal processing module may be used to determine characteristics of the subject medium based upon the output of the detector. The signal processing can include identifying a peak frequency of the autodyne signal and determining a velocity associated with the subject medium.

The features, functions, and advantages discussed herein may be achieved independently in various embodiments of the present description or may be combined in yet other embodiments, further details of which can be seen with reference to the following description and drawings.

DETAILED DESCRIPTION

Figure 1:
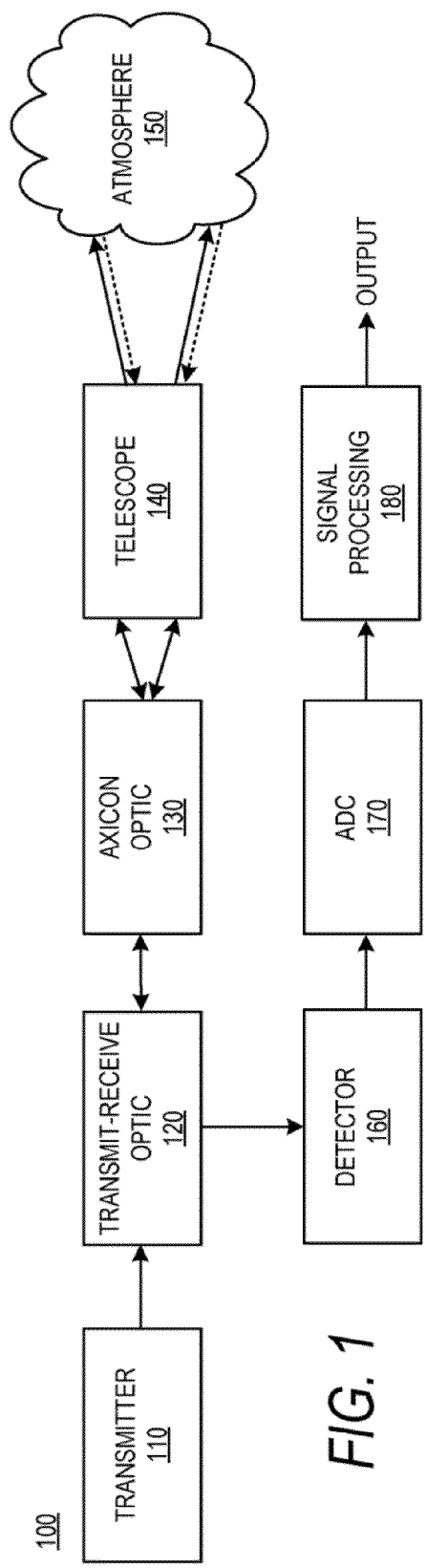
FIG. 1 is a block diagram illustrating a multifunction aircraft LIDAR system according to one or more embodiments presented herein.

The following detailed description discloses a multifunction aircraft LIDAR system for supporting single or multiple sensor functions within an aircraft or other system. This description is most readily understood with reference to the attached drawings, in which like reference numbers may appear in different drawings to refer to similar elements.

A multifunction LIDAR system for aircraft applications may use autodyne techniques. Autodyne LIDAR can significantly reduce the complexity of LIDAR solutions in comparison to the heterodyne solutions of traditional coherent LIDAR systems. An autodyne system can use a single laser source and a single detector. The autodyne technique can mix two signal beams to produce a "beat note" at the frequency difference between the beams. Autodyne detection can leverage photon counting to support significantly reduced system complexity over coherent heterodyne LIDAR systems. Reduced complexity may provide solutions with significantly reduced power consumption, lighter weight, smaller volume, and lower cost.

The multifunction LIDAR system can detect and identify regions of weather hazards such as lightning storms, aircraft wake vortex, clear air turbulence, and wind shear. The multifunction LIDAR system may also be configured to measure aircraft air and ground speed in multiple dimensions as well as aircraft altitude. Since light sources, such as lasers, may have shorter wavelengths than the radio signals used in radar, LIDAR systems may be sensitive to smaller particles, such as aerosols, ice, clouds, dust, and small raindrops. The motions of such small particles may be sensed by the LIDAR, and used for wind speed detection and the detection of atmospheric phenomena. Range resolved wind speed may be measured in x, y, and z directions. The range of wind speeds may also be measured. Atmospheric particle density may be measured. These particles may include aerosols, smoke, clouds, ice, rain, vapor, and so forth.

The multifunction nature of the LIDAR can support functionality traditionally provided by various components. These various components may traditionally be installed as entirely separate subsystems. By simplifying the LIDAR design and supporting multifunction operations, more functionality may be provided in a much smaller package. The multifunction LIDAR system may be used to provide a variety of data beyond traditional single function RADAR or LIDAR packages. These LIDAR systems can provide visibility into atmospheric conditions around an aircraft. The multiple functions of the multifunction LIDAR system operating together as a system can provide significantly improved ability to optimize flight path, adapt to turbulence, avoid particulates such as ash or areas of high lighting potential, and provide vortex warning and avoidance.

The multifunction LIDAR system can support identification of weather hazard regions for aircraft. Prior warning may be provided prior to flying into weather events or other atmospheric phenomena. The warning may be provided 30 seconds, or more, prior to reaching the weather phenomena. Other warning periods, such as less than 30 seconds, may also be support with the multifunction LIDAR system.

The multifunction LIDAR system may support multiple modes of operation. For example, both downdraft and sidewind sensing may be supported within one device by simply rotating an axicon optic during operation. Such a system may support turbulence or vortex detection along with particulate detection while also functioning as an airspeed sensor. Further capabilities may even support bird strike detection and avoidance. Such a multifunction LIDAR system may supplement or replace other aircraft sensor systems. For example, the multifunction LIDAR system may replace pitot tube devices, which are bulky, heavy, sensitive to damage, and may require kilowatts of heating and specialized pressure tubing for installation. Supporting multiple functions within a single line replaceable unit (LRU) can improve operational redundancy, simplify maintenance, reduce inventory, and support the swapping out of interchangeable sensor units for more critical installations in the field or when inventory is low.

Turning first to FIG. 1, a block diagram illustrates a multifunction aircraft LIDAR system 100 according to one or more embodiments presented herein. A transmitter 110 may be a laser or other light source. A transmit-receive optic 120 may serve as a transmit-receive switch. The transmit-receive optic 120 may be a hole mirror, a polarizer, a lens, or other optical element according to embodiments. A beam splitting optical element, such as an axicon optic 130 may be used to produce two beams from the one beam from the transmitter 110. While not illustrated here, a beam steering device, such as a Risley prism or beam steering mirror, may also be incorporated according to embodiments. A telescope 140 may be used to sight the two beams from the LIDAR system onto an object or area for measurement such as the atmosphere 150, the ground, or other objects. The telescope 140 may also serve to collect scattered beams reflected back from the object or area for measurement.

The optical path for the received signal from the transmit-receive optic 120 may be directed to a detector 160. A laser line filter may be used to prevent other signals from entering the detector 160. The detector 160 may be a photon counting detector, an avalanche photodiode, an intensified avalanche photodiode, a positive-intrinsic-negative (PIN) diode, or other photonic detecting device. The detector may comprise a single element or multiple elements. An output signal from the detector 160 may be sampled at an analog to digital converter (ADC) 170. For photon counting configurations, the ADC 170 may have a reduced resolution of between one and four bits. Other resolutions of ADC may also be employed.

A digital signal generated by the ADC 170 may proceed to signal processing 180. The signal processing 180 may involve one or more processors, microprocessors, digital signal processors, processing circuits, or other digital signal processing platforms. The signal processing 180 may support an algorithm to determine a frequency peak, a width, and an intensity of the return signal. For example, signal processing 180 may support determining a Fourier transform of the temporal signal, squaring the result, performing a threshold operation, and identifying a peak in the processed signal. An area of the peak may be determined, for example by using the height of the peak times the width of the peak. All of these values may also be corrected for range. The signal processing 180 may also support an algorithm to establish frequency bins for the returned Doppler signals, compress the Doppler bins, reduce the Doppler resolution in instances of wide particle velocity spreads, and increase the sensitivity to the returned signal.

As described above, the transmitter 110 may be a laser, other light source, or other electromagnetic source. According to various embodiments, the transmitter 110 can operate in a pulsed mode producing short pulses of one to five microseconds. The pulses may be generated at a repetition rate of 100 Hz or more. Other pulse timings, other repetition rates, or other operating modes may also be supported. The transmitted pulses may have several shapes such as a tone, a chirped pulse, a pulse train, or other pulse shaping or sequences. The returned pulses may be sampled in time to measure a particular region of the atmosphere 150. This time limited sampling may be referred to as range gating. The transmitter 110 may have a coherence length of at least the inverse of one pulse length.

The beam splitting optical element, such as the axicon optic 130, can split the transmitted beam into two. The two beams may then sample two regions of the atmosphere 150 or other measurement object. The angle between the beams may be approximately one to ten degrees or any other angle. The scattered light from each region is collected, and combined or mixed. Due to the geometry of the two beams, each may have a different Doppler shift resulting in a beat frequency, or an intermediate frequency, at the detector 160. This intermediate frequency depends on the difference of each beam's Doppler frequency. As one sensor example, wind speed may be determined by the expression $V=f(\lambda/2)$ where f is the intermediate frequency and $\lambda$ is the signal wavelength.

The multifunction LIDAR system can directly measure wind speed in the x, y, or z axis without measuring contributions from the other two directions. The range of wind speeds in each direction may also be measured. The multifunction LIDAR system can determine the relative density of scattering particles from the intensity of the return signal. The multifunction LIDAR system can also measure aircraft ground speed in the x and y dimensions as well as in elevation as discussed in further detail with respect to FIG. 6.

Measurements made by the multifunction LIDAR system can be range gated at the detector. By sampling the detector output at a given time, a range may be established based on the round-trip light-time from the transmitter to the detector. According to one embodiment, speed measurements may be range-resolved to every 300 meters up to a final distance of 10 km. Other range steps and total ranges may also be established according to embodiments.

The LIDAR can scan in elevation or azimuth, so that a five dimensional image of the wind field is generated. These dimensions may include angle, range, speed, width, and particle density. The resolution of velocity measurements may be determined by a waveform of the laser pulses. Thus, the resolution may be selectable based on specifying the waveform.

The multifunction LIDAR system can determine regions of high likelihood for lightning. The regions can be identified as those supporting conditions for the generation of charge. For example, high particle count, high velocity, or a certain range of velocities over a given angular range may support increased charge generation.

The multifunction LIDAR system can determine the location of wind shear. Wind shear can be detected by measuring vertical and on-axis wind speeds. The location of clear-air turbulence may also be identified by measuring vertical, horizontal, and/or on-axis wind speeds. Thus, the multifunction LIDAR system can support identifying and avoiding areas of turbulence. Avoiding turbulence can reduce jet engine inlet stalling, especially in supersonic aircraft. Additionally, locations of aircraft wake field vortices may be identified and avoided by measuring both vertical and horizontal wind speeds.

The multifunction LIDAR system can determine the headwind or tailwind speed in regions above and below the aircraft. This information can be used to determine an optimal altitude to minimize headwind and to adjust the aircraft altitude for improving fuel economy.

The two return beams scattered from the atmosphere 150, or other measurement subject, can combine within the optical splitter/combiner element such as the axicon optic 130. This combining of the return beams can form an autodyne signal. The frequency produced by mixing the two signals can be a function of both wind speed and the separation angle of the two beams. The frequency can be adjusted by varying the separation angle. The derivation of the autodyne signal follows from the electric field scattered from an aerosol particle.

$$E_1 = Amplitude * Phase * Doppler * LaserFrequency$$

$$E_1 = A_1 * \text{Exp}(i\phi_1^{random}) * \text{Exp}\left[i2\pi\left(\frac{2V_1^{LOS}}{\lambda}\right)t\right] * \text{Exp}(i\omega_{laser}t)$$

Figure 2:
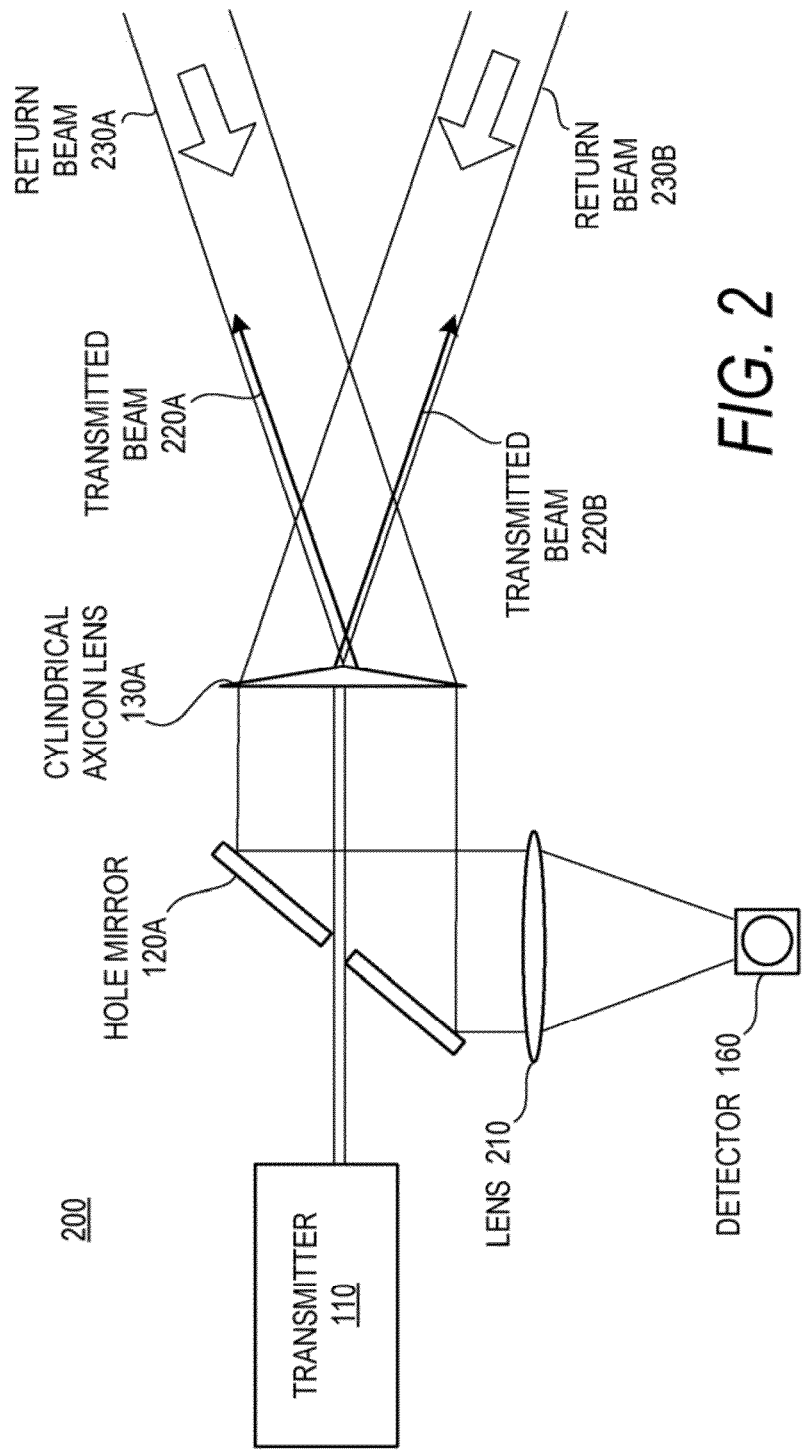
FIG. 2 is an optical component diagram illustrating a configuration of a multifunction aircraft LIDAR system according to one or more embodiments presented herein.

Turning now to FIG. 2, an optical component diagram illustrates a configuration 200 of a multifunction aircraft LIDAR system 100 according to one or more embodiments presented herein. The transmitter 110 may be a laser or other light source. A hole mirror 120A may serve as a transmit-receive optic 120. A cylindrical axicon lens 130A may serve as a beam splitting and combining element. A first transmitted beam 220A may scatter off of an object for measurement producing a first return beam 230A. A second transmitted beam 220B may scatter off of an object for measurement producing a second return beam 230B.

The first return beam 230A and the second return beam 230B may be combined within the cylindrical axicon lens 130A where the signals are mixed. The hole mirror 120A can direct the mixed return means through a lens 210 onto the detector 160. Other optical elements, such as a laser line filter, a beam steering optic, and a telescope are not illustrated. Rotation of the axicon lens 130A can rotate the beams such that wind in the vertical and horizontal directions may be measured. While lenses are illustrated as the optical elements within one embodiment of the LIDAR system, one or more other embodiments may use mirrors or any combination or reflective and refractive elements.

The two return beams may have an axially symmetric geometry. The geometry of the two return beams can result in sensitivity to one component of velocity at a time, thereby separating the measurement dimensions and supporting simplified analysis and signal processing. The two beams may be scanned in azimuth and elevation to produce a two-dimensional image of weather conditions in angle and range. The return beams may be scattered by atmospheric particles such as rain, clouds, ice, hail, dust. This type of scattering may be classified as Mie scattering. Other scattering types, such as Rayleigh and Raman scattering, may also be involved.

Since the multifunction aircraft LIDAR system can utilize a direct detection scheme, an additional LO laser may be avoided. A photon counting device may be used as the detector 160. Such a device can be extremely sensitive and the output may be captured using a one or two bit digitizer for ADC 170. The reduced ADC 170 complexity can significantly simplify the LIDAR system.

In a traditional sensor solution, a Fabry-Perot etalon is used to measure small frequency changes. A series of interference rings is produced where the spacing and width of the rings determine the change in frequency and the spread in velocity of measured object. The autodyne approach of the multifunction LIDAR system can establish its velocity resolution by a waveform used to pulse the laser. In the etalon approach, transmitter laser linewidth and the etalon spacing determine resolution. The etalon solution results in a more complex and less robust solution than that supported by the multifunction LIDAR system. Furthermore, signal imaging in etalon techniques divides the received signal among many detectors thereby reducing sensitivity. The multifunction LIDAR autodyne technique can leverage a single detector solution thus providing improved sensitivity.

Figure 3:
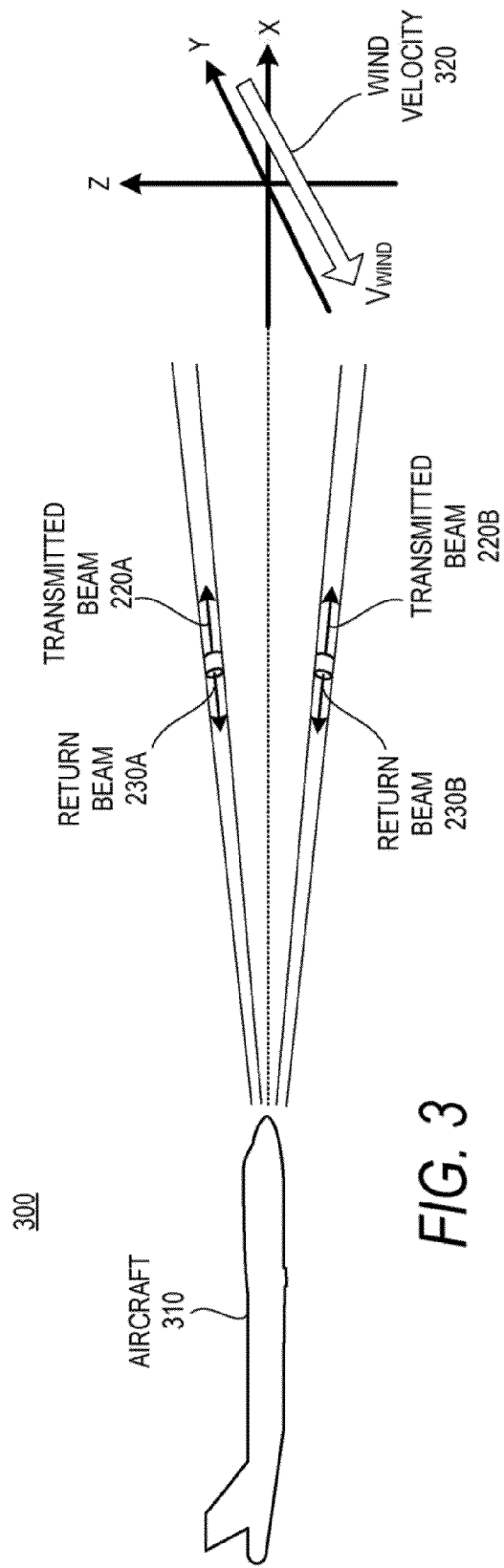
FIG. 3 is an optical beam diagram illustrating a configuration of a multifunction aircraft LIDAR system for measurement of wind in the Y direction according to one or more embodiments presented herein.

Turning now to FIG. 3, an optical beam diagram illustrates a configuration 300 of a multifunction aircraft LIDAR system 100 for measuring wind in the Y direction according to one or more embodiments presented herein. An aircraft 310 equipped with one or more multifunction aircraft LIDAR systems can be traveling in the X direction. The LIDAR system can generate a first transmitted beam 220A and a second transmitted beam 220B. The transmitted beams can reflect from regions of the atmosphere 150 have a wind velocity 320 in the Y direction. The reflected signals can return to the aircraft 310 as a first return beam 230A and a second return beam 230B. The beams may be scanned in the z direction to measure the Y-directed wind velocity 320 at various elevations.

According to one or more other embodiment (not illustrated) the LIDAR sensor geometry may be established for measuring wind velocity in the Z direction. In that case the beams may be scanned in the Y direction to measure the Z directed wind velocity at various angles.

In a large commercial aircraft, the LIDAR system may be positioned in a nose mounted configuration. By decreasing power and size requirements while expanding functionality, the possibility of mounting the same device in multiple locations across the aircraft may also be supported. This flexibility may provide maintenance, installation, and weight benefits.

In smaller aircraft applications, the ability for one device to perform multiple functions can provide manufacturers bulk fabrication advantages. Sensor package function variations may consist of mounting the same hardware for different applications across the aircraft, reducing the need for specialized single use designs.

Reduced power and scalable design of the multifunction LIDAR system can apply additional applications where power, weight, or size becomes critical. For example, remote unattended solar-powered weather stations and other ground based sensing systems may leverage the multifunction LIDAR technology. Traditionally, the sensor infrastructure and resources are placed into a single high-powered long range RADAR site for applications such as Doppler radar. Smaller, lower cost multifunction LIDAR systems may be distributed across a much wider area. The higher sensitivity of the multifunction LIDAR can provide benefits for local area monitoring or provide high redundancy monitoring over an extended area.

Small stationary LIDAR installations could be used as stand-alone sites or as attachment to other equipment where air-speed, gusting and other weather effects are of critical importance. For example, rifle firing, where pre-emptive notification or visibility of wind changes across a landscape can be compensated for by sighting equipment.

Ground, mobile, aircraft, or seacraft installations too small or dated to support a full RADAR solution may leverage the multifunction LIDAR system. Also, remote stations can provide warnings and conditional information with more accuracy than a larger RADAR system. For field deployments, multifunction LIDAR systems may be relocated as needed. Multifunction LIDAR systems may also be attached to unmanned ground vehicles for remote repositioning. Similarly, drones, balloons, unmanned aircraft, and various other systems may benefit from the multifunction LIDAR system for reduced power and size support. By combining multiple functions into a single sensing package, more functionality can be supported without sacrificing payload, power, or range budgets.

The multifunction LIDAR may be used in association with wind farms and solar farms. Since a wind or solar farm can span a considerable area of land, point source sensing may prove to be limited or too expensive. The multifunction LIDAR may be deployed more cheaply and over a broader area than other competing technologies. LIDAR controlled adaptive pitch control devices can be used to improve the efficiency of power generation. Adaptive pitch control devices may also be used to position power generating devices into a safe mode in dangerous wind or other weather conditions. Use of lower cost multifunction LIDAR systems can support installation-by-installation adaptability to changing wind environments. Predictive avoidance of bird strikes to wind turbines may be supported by feathering turbines or braking turbines where birds are entering the area. Autonomous scare devices may also be deployed in conjunction with multifunction LIDAR systems to drive birds from the area.

Marine applications where wind is of critical concern to operation may benefit from multifunction LIDAR systems. Generation of power using sails and kites may similarly benefit. For smaller craft, power usage and size may be of critical importance. Large RADAR systems sets can become cost prohibitive and too power intensive to use and may also be of limited use for weather analysis.

Figure 4:
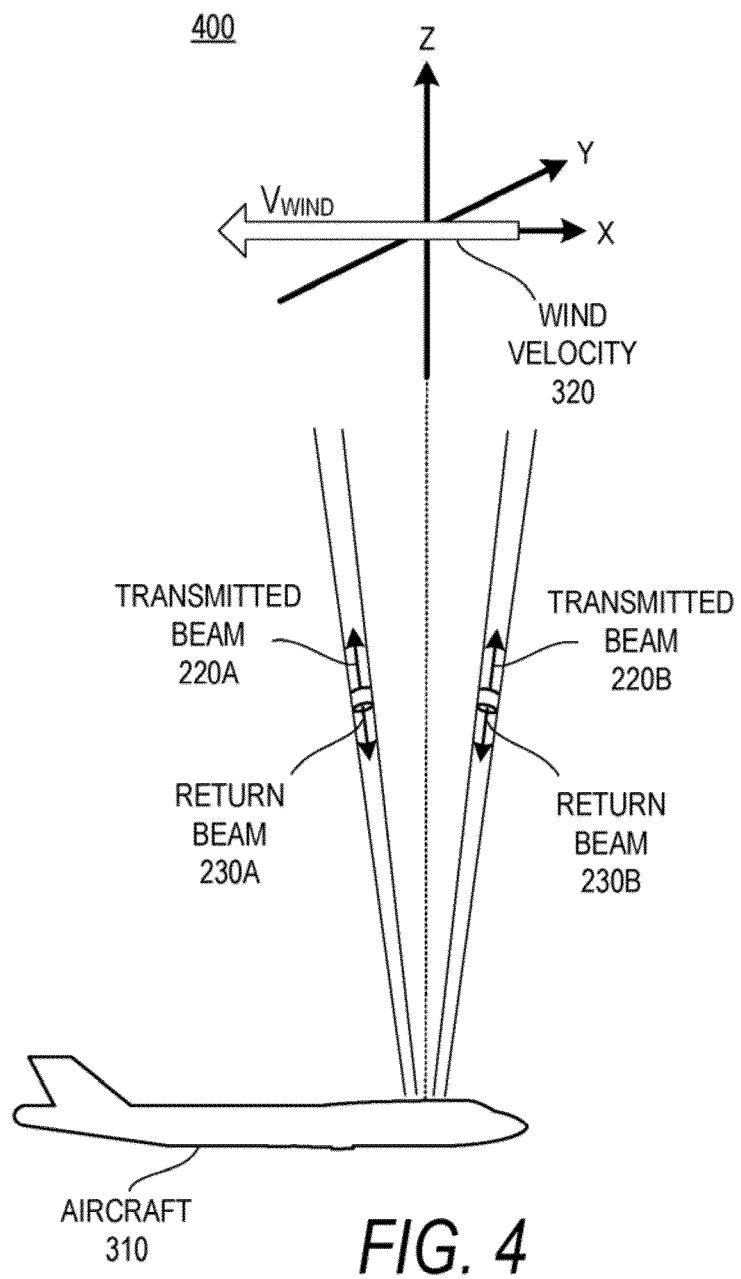
FIG. 4 is an optical beam diagram illustrating a configuration of a multifunction aircraft LIDAR system for measurement of wind speed above an aircraft according to one or more embodiments presented herein.

Turning now to FIG. 4, an optical beam diagram illustrates a configuration 400 of a multifunction aircraft LIDAR system 100 for measuring wind speed above an aircraft 310 according to one or more embodiments presented herein. An aircraft 310 equipped with one or more multifunction aircraft LIDAR systems can be traveling in the X direction. The LIDAR system can generate a first transmitted beam 220A and a second transmitted beam 220B. The first transmitted beam 220A and the second transmitted beam 220B can reflect from regions of the atmosphere 150 have a wind velocity 320 in the X direction. The reflected signals can return to the aircraft 310 as a first return beam 230A and a second return beam 230B. The first transmitted beam 220A and the second transmitted beam 220B can be directed upward or downward from the aircraft 310 to measure wind speeds above or below the aircraft 310.

Figure 5:
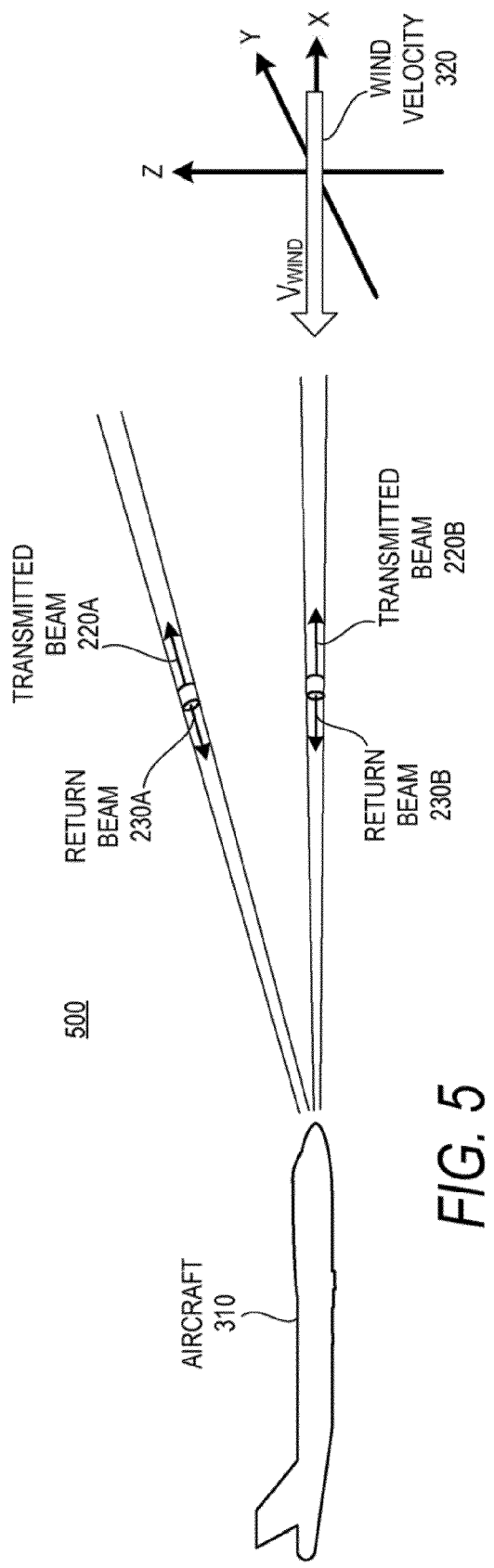
FIG. 5 is an optical beam diagram illustrating a configuration of a multifunction aircraft LIDAR system for measurement of wind speed in the direction of travel of an aircraft according to one or more embodiments presented herein.

Turning now to FIG. 5, an optical beam diagram illustrates a configuration 500 of a multifunction aircraft LIDAR system 100 for measuring wind speed in the direction of travel of an aircraft 310 according to one or more embodiments presented herein. An aircraft 310 equipped with one or more multifunction aircraft LIDAR systems can be traveling in the X direction. The LIDAR system can generate a first transmitted beam 220A and a second transmitted beam 220B. The first transmitted beam 220A and the second transmitted beam 220B can reflect from regions of the atmosphere 150 have a wind velocity 320 in the X direction. The reflected signals can return to the aircraft 310 as a first return beam 230A and a second return beam 230B. The first transmitted beam 220A and the second transmitted beam 220B can be directed at a forward angle from the aircraft 310 but generally in the X direction of travel.

This configuration can measure net wind speeds with a component in the X direction and a component in the Z direction. Additional Z direction measurements can support separating the X directed components from the net measurement. Net x wind plus the component of the wind in the z direction. The beams may be scanned in the Y direction to measure X and Z wind speeds at various angles away from the direction of flight.

Figure 6:
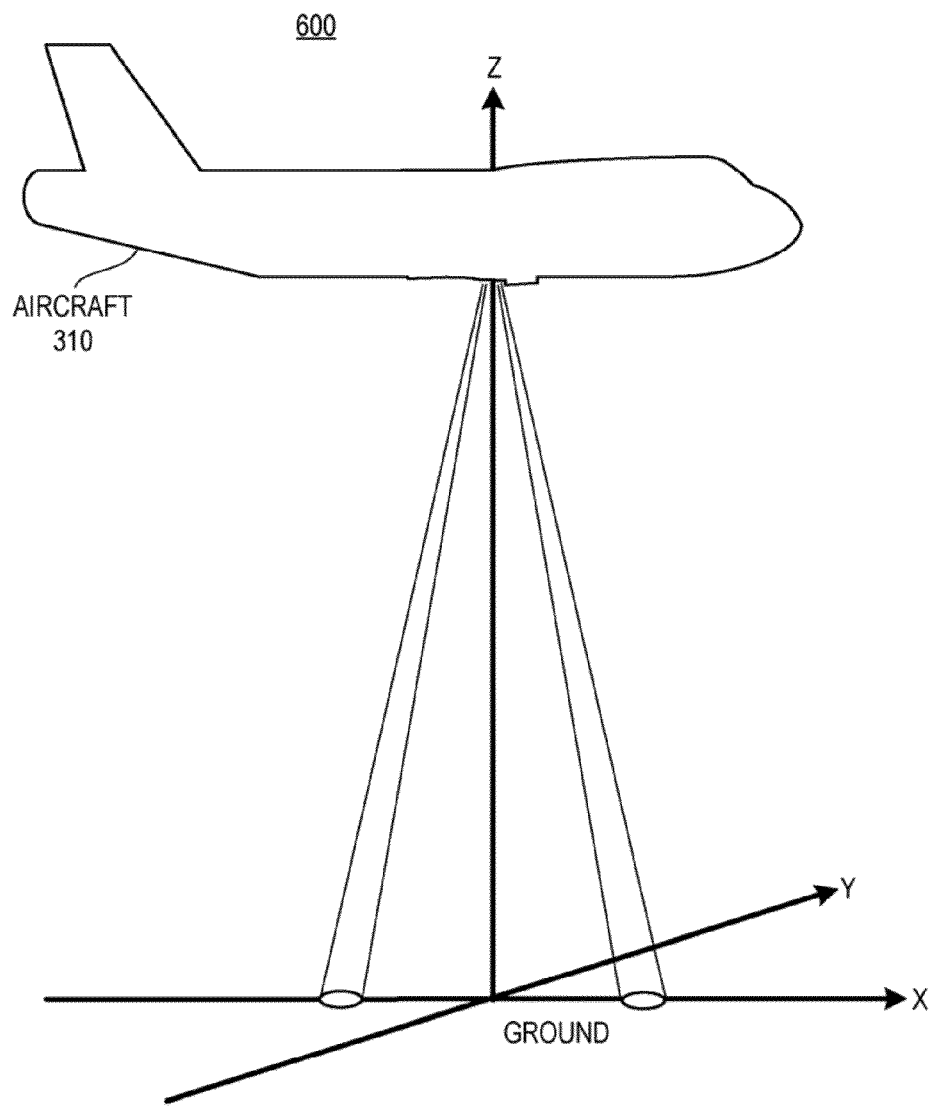
FIG. 6 is an optical beam diagram illustrating a configuration of a multifunction aircraft LIDAR system for measurement of ground speed in the direction of travel of an aircraft according to one or more embodiments presented herein.

Turning now to FIG. 6, an optical beam diagram illustrates a configuration 600 of a multifunction aircraft LIDAR system 100 for measuring ground speed in the direction of travel of an aircraft 310 according to one or more embodiments presented herein. An aircraft 310 equipped with one or more multifunction aircraft LIDAR systems can be traveling in the X direction. The LIDAR system can generate a first and a second transmitted beam. The transmitted beams can reflect from regions of the ground separated along the X axis of travel. The reflected signals can return to the aircraft 310 to be autodyne mixed within the multifunction LIDAR system thus extracting the X dimension of motion.

An alternative beam positioning that is not illustrated can measure ground velocity in the Y direction. By positioning the two beams to reflect from the ground at areas distributed along the Y axis, orthogonal from the direction of flight, the Y directed ground speed may be determined in a similar fashion as the X directed ground speed. The altitude, or Z direction range, may be determined by a time of flight for the reflected laser pulse.

Figure 7:
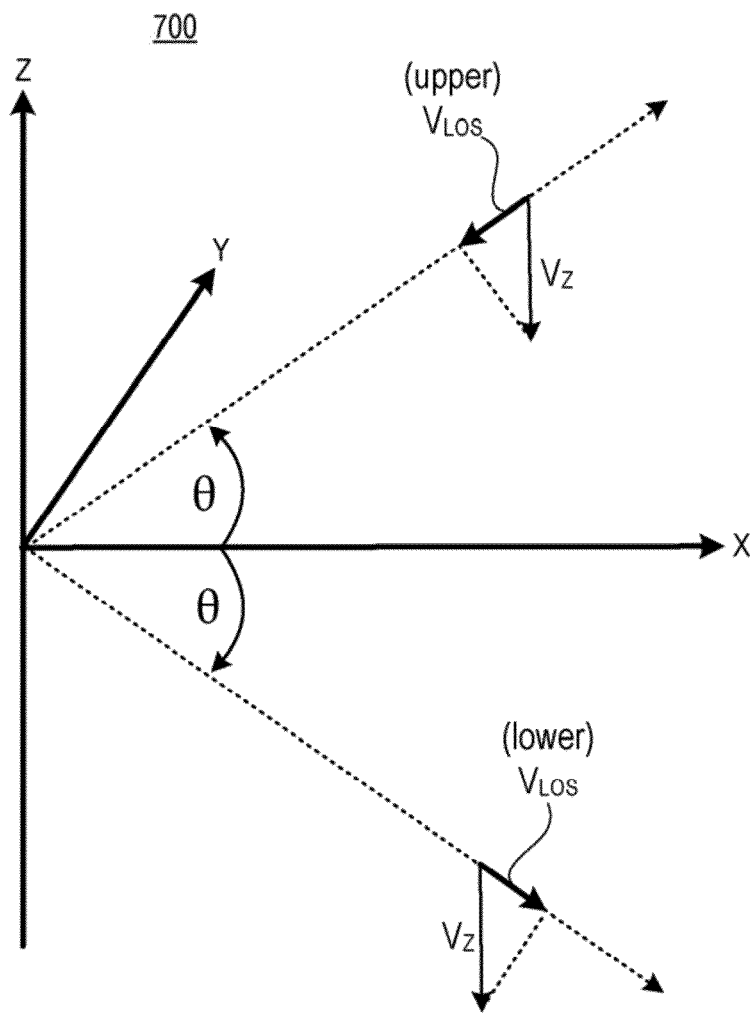
FIG. 7 is a vector diagram illustrating dimensional decomposition of a wind speed vector orthogonal to the direction of measurement according to one or more embodiments presented herein.

Turning now to FIG. 7, a vector diagram 700 illustrates dimensional decomposition of a wind speed vector orthogonal to the direction of measurement according to one or more embodiments presented herein. A wind speed vector $V_Z$ in the Z direction has components directed along the laser line of sight $V_{LOS}$ as well as components normal to the line of sight.

The wind speed components directed along the laser line of sight $V_{LOS}$ point toward the laser for an upper beam, such as return beam 230A, and away from the laser in a lower beam, such as return beam 230B. This directions difference in the line of sight components produces a Doppler shift that is opposite in sign. When the electric fields of the opposite signed signals are subtracted a frequency tone remains producing an intermediate frequency (IF) signal. The IF signal can be detected within the signal processing modules 180 via the autodyne mechanism of the multifunction LIDAR system.

The electric fields of two beams reflected from two particles may be added and then multiplied by the complex conjugate to calculate an intensity of the returned signal.

$$I = (E_1 + E_2) * (E_1 + E_2)^*$$
$$I = E_1 * E_1^* + E_1 * E_2^* + E_2 * E_1^* + E_2 * E_2^*$$
$$\text{given: } E_1 * E_1^* = E_2 * E_2^* = 1$$
$$\text{given: } \omega = 2\pi\left(\frac{2V^{LOS}}{\lambda}\right)$$
$$\text{given: } \phi_1^{random} - \phi_2^{random} = \phi^{random}$$
$$I(t) = 2 + \text{Exp}[i\phi^{random} + i(\omega_1 - \omega_2)t] + \text{Exp}[-i\phi^{random} - i(\omega_1 - \omega_2)t]$$
$$I(t) = 2 + 2\cos[\phi^{random} + (\omega_1 - \omega_2)t]$$

The derivation shows that the IF signal can be represented as the cosine of a phase term and a frequency difference of the two E fields. If the frequencies are equal and opposite in sign, such as $\omega_1 = -\omega_2$ in this instance, then the IF can be represented as proportional to the cosine of twice the Z directed wind speed Doppler frequency.

$$I(t) = 2 + 2\cos[\phi^{random} - 2\omega t]$$

Figure 8:
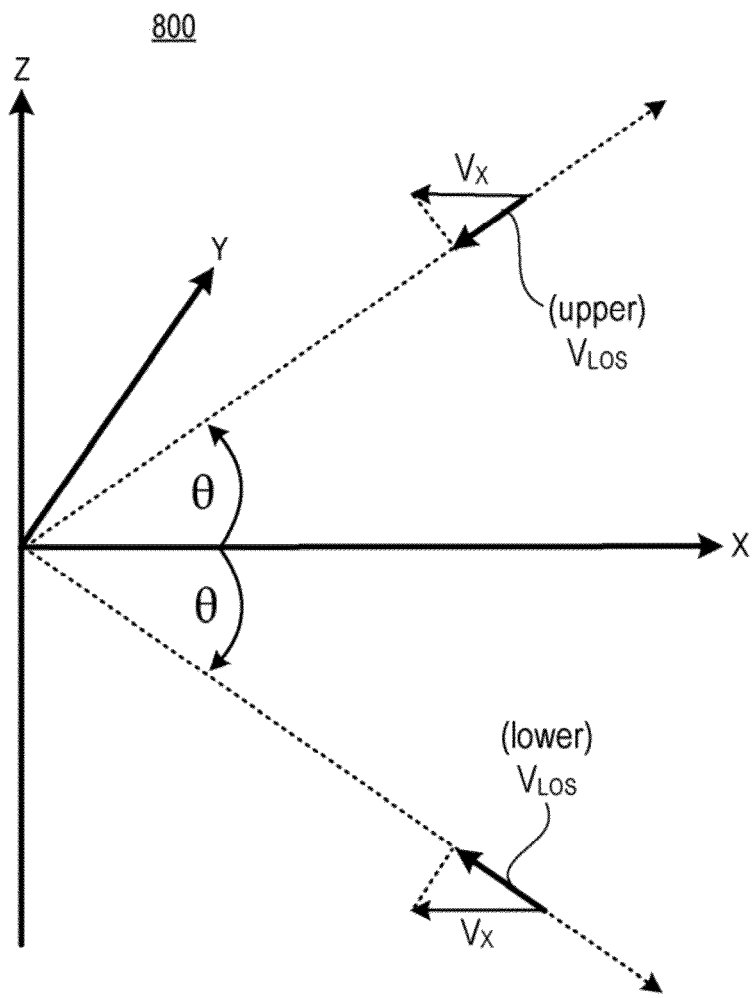
FIG. 8 is a vector diagram illustrating dimensional decomposition of a wind speed vector directed along the direction of measurement according to one or more embodiments presented herein.

Turning now to FIG. 8, a vector diagram 800 illustrates dimensional decomposition of a wind speed vector directed along the direction of measurement according to one or more embodiments presented herein. A wind speed vector $V_X$ in the X direction has components directed along the laser line of sight $V_{LOS}$ as well as components normal to the line of sight.

The wind speed components directed along the laser line of sight $V_{LOS}$ point toward the laser for both the upper beam and the lower beam. These components produce a Doppler shift that is equal in sign. When the electric fields of the equally signed signals are subtracted a frequency, a signal at DC offset remains. This DC signal may be separated from the intermediate frequency (IF) signal within the signal processing modules 180 of the multifunction LIDAR system. The IF and DC frequency separation can be increased by increasing the angle theta.

The electric fields of two beams reflected from two particles may be added and then multiplied by the complex conjugate to calculate an intensity of the returned signal.

$$I = (E_1 + E_2) * (E_1 + E_2)^*$$
$$I = E_1 * E_1^* + E_1 * E_2^* + E_2 * E_1^* + E_2 * E_2^*$$
$$\text{given: } E_1 * E_1^* = E_2 * E_2^* = 1$$
$$\text{given: } \omega = 2\pi\left(\frac{2V^{LOS}}{\lambda}\right)$$
$$\text{given: } \phi_1^{random} - \phi_2^{random} = \phi^{random}$$
$$I(t) = 2 + \text{Exp}[i\phi^{random} + i(\omega_1 - \omega_2)t] + \text{Exp}[-i\phi^{random} - i(\omega_1 - \omega_2)t]$$
$$I(t) = 2 + 2\cos[\phi^{random} + (\omega_1 - \omega_2)t]$$

The derivation shows that the IF signal can be represented as the cosine of a phase term and a frequency difference of the two E fields. If the frequencies are equal, such as $\omega_1 = \omega_2$ in this instance, then they can sum to zero and produce a constant DC term which is separable from the IF.

$$I(t) = 2 + 2\cos[\phi^{random}]$$

Figure 9:
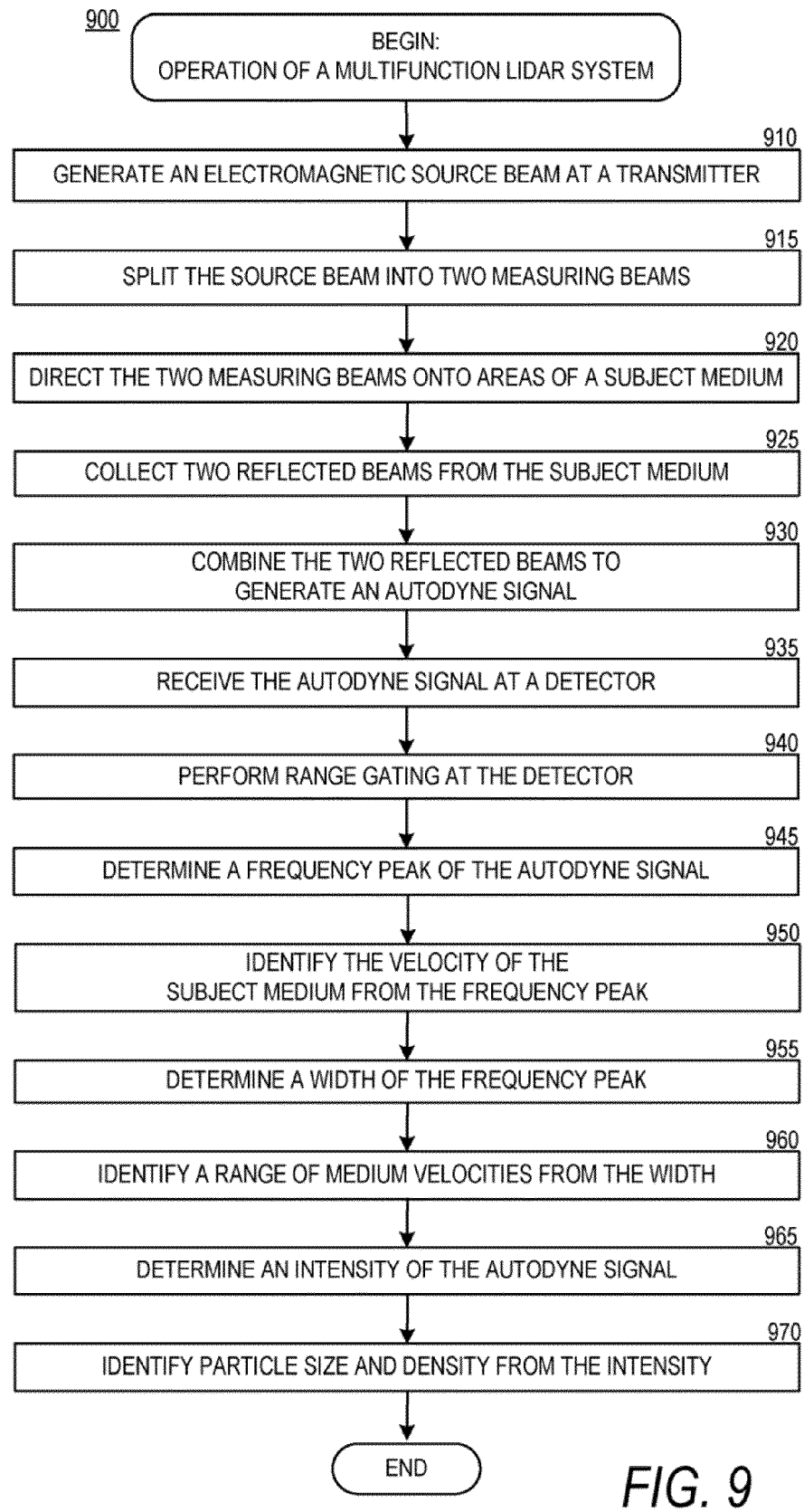
FIG. 9 is a flow diagram for a routine that illustrates aspects of a process for operating a multifunction LIDAR system according to one or more embodiments presented herein.

Turning now to FIG. 9, additional details will be provided regarding the embodiments presented herein for a multifunction LIDAR system. In particular, FIG. 9 is a flow diagram showing a routine 900 that illustrates aspects of a process for operating a multifunction LIDAR system according to embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 900 begins with operation 910 where an electromagnetic source beam is generated at a transmitter 110. The transmitter 110 may be a laser or any other electromagnetic energy source. At operation 915, the source beam may be split into two measuring beams. A beam splitting optical element, such as an axicon optic 130 may be used to produce two beams from the one beam from the transmitter 110.

At operation 920, the two measuring beams may be directed onto areas of a subject medium. The beams may be directed by any combination of lenses or reflectors such as those within a telescope 140. The subject medium may be areas of the ground, ground features, the atmosphere 150 surrounding the LIDAR system, weather phenomena, or various other objects. The beams may reflect from the subject medium as two reflected beams. At operation 925, the two reflected beams may be collected from the subject medium. At operation 930, the two reflected beams may be combined to generate an autodyne signal. A beam splitting optical element, such as an axicon optic 130 may be used to combine the two reflected beams.

At operation 935, the autodyne signal may be received at a detector. The detector can convert an intensity, or presence, of the received autodyne signal into an electrical signal. The autodyne signal can indicate characteristics of the subject medium. These characteristics can include various distances, ranges, velocities, densities, and so on as presented herein. At operation 940, range gating can be performed at the detector. The received autodyne signal may be sampled in time to measure at a particular distance such as a particular region of the atmosphere 150. Range timing may also be used to determine the path length of the reflected signal for applications such as altitude determination.

At operation 945, a frequency peak of the autodyne signal may be determined. Determining the peak frequency may include determining a Fourier transform of the temporal autodyne signal, squaring the result, performing a threshold operation, and identifying a peak in the processed signal.

At operation 950, the velocity of the subject medium may be determined from the frequency peak. The frequency peak may correspond to a Doppler frequency from which a velocity can be determined as discussed with respect to FIGS. 7 and 8.

At operation 955, a width of the frequency peak may be determined. At operation 960, a range of medium velocities may be determined from the width. A larger range of subject medium velocities may be reflected in a wider peak in the Fourier domain analysis.

At operation 965, an intensity of the autodyne signal may be determined. At operation 970, particle size and density may be determined from the intensity established in operation 965. The intensity may be proportional to particle size or particle density within the subject medium.

Figure 10:
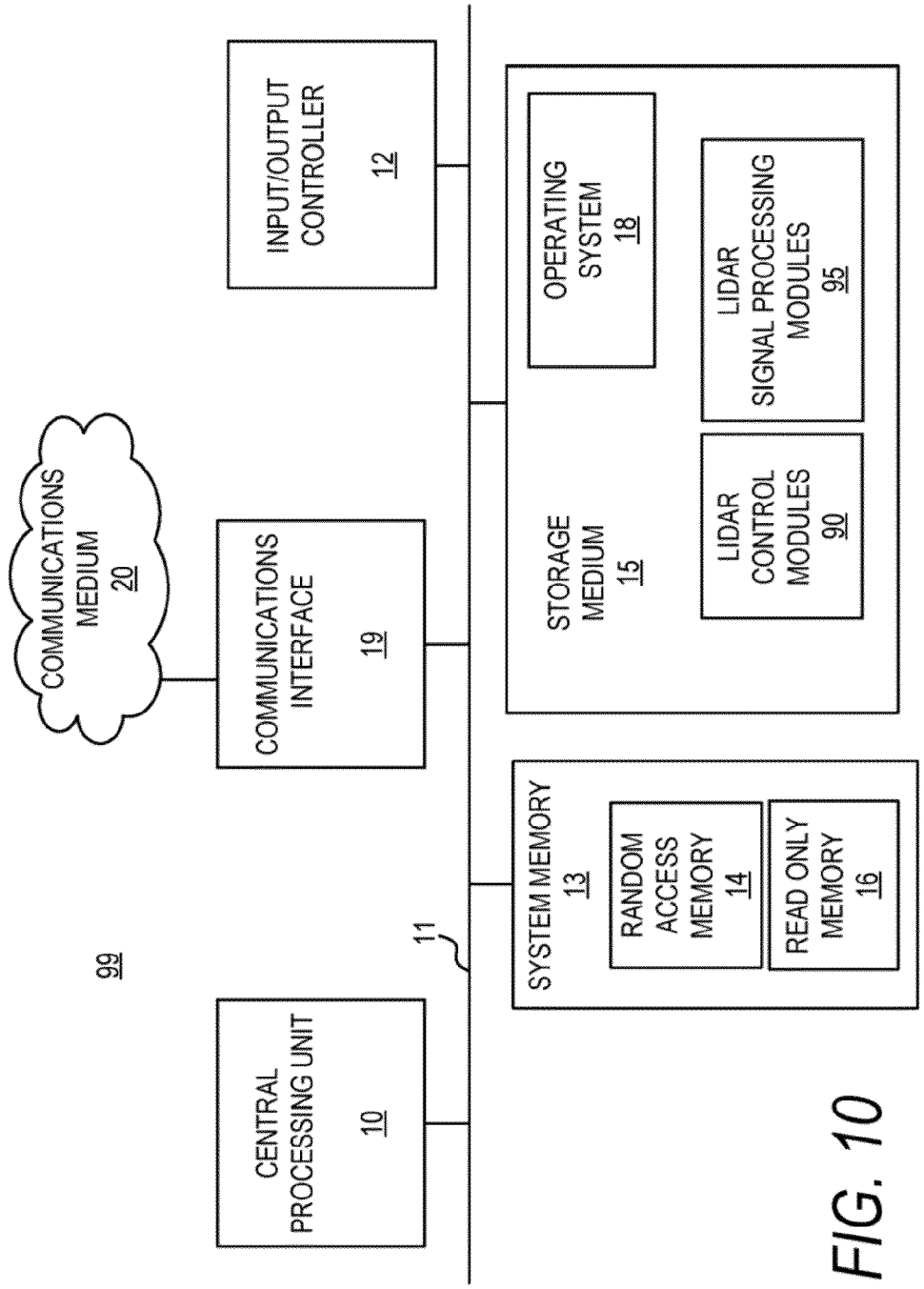
FIG. 10 is a computer architecture diagram illustrating computing system hardware capable of performing control operations and signal processing associated with a multifunction LIDAR system according to one or more embodiments presented herein.

Turning now to FIG. 10, an illustrative computing device 99 can execute software components described herein for control operations and signal processing associated with a multifunction LIDAR system. The computer architecture shown in FIG. 10 illustrates a computing device 99 associated with the multifunction LIDAR system. The computer 99 may be utilized to execute aspects of the software components presented herein. It should be appreciated however, that the described software components can also be executed on other computing environments.

The computer 99 architecture illustrated in FIG. 10 can include a central processing unit 10 (CPU), a system memory 13, including a random access memory 14 (RAM) and a read-only memory 16 (ROM), and a system bus 11 that can couple the system memory 13 to the CPU 10. A basic input/output system containing the basic routines that help to transfer information between elements within the computer 99, such as during startup, can be stored in the ROM 16. The computer 99 may further include a storage medium 15 for storing an operating system 18, software, data, and various program modules, such as those associated with LIDAR control modules 90 and LIDAR signal processing modules 95. The LIDAR control modules 90 and LIDAR signal processing modules 95 may include signal processing 180 and LIDAR operation process 900 functionality presented herein.

The storage medium 15 can be connected to the CPU 10 through a storage controller (not illustrated) connected to the bus 11. The storage medium 15 may comprise computer-readable media configured to support non-volatile storage for the computer 99.

Although the description of computer-readable media contained herein refers to a storage device, such as non-volatile memory, it should be appreciated by those skilled in the art that computer-readable media can be any available computer storage media that can be accessed by the computer 99 or used to configure or load the computer 99. By way of example, and not limitation, these computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by, or used to configure, the computer 99.

The computer 99 may support logical connections to remote computers through a communications medium 20 such as a network, a wired network, a wireless network, or a wireless radio command and control link. The computer 99 may connect to the communications medium 20 using a communications interface 19 connected to the bus 11.

The computer 99 may also include an input/output controller 12 for receiving and processing input from various devices, interfaces, or peripherals (not illustrated). Similarly, the input/output controller 12 may provide output various devices, interfaces, or peripherals (also not illustrated).

Based on the foregoing, it should be appreciated that technologies for multifunction LIDAR systems are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for operating a multifunction light detection and ranging (LIDAR) system, the method comprising:
    generating an electromagnetic source beam;
    splitting the electromagnetic source beam by an axicon lens to provide a first measuring beam and a second measuring beam;
    directing the first measuring beam and the second measuring beam in a first direction onto first areas of a subject medium such that the first measuring beam and the second measuring beam diverge from the electromagnetic source beam to separate first areas of the subject medium;
    collecting a first return beam from the first measuring beam reflected off of the subject medium and a second return beam from the second measuring beam reflected off of the subject medium;
    combining the first return beam and the second return beam to generate a first autodyne signal;
    determining characteristics of the subject medium in the first direction from the first autodyne signal;
    steering the first measuring beam and the second measuring beam by the axicon lens in a second direction onto second areas of the subject medium such that the first measuring beam and the second measuring beam diverge from the electromagnetic source beam to separate second areas of the subject medium;
    collecting a third return beam from the first measuring beam reflected off of the subject medium and a fourth return beam from the second measuring beam reflected off of the subject medium;
    combining the third return beam and the fourth return beam to generate a second autodyne signal; and
    determining characteristics of the subject medium in the second direction from the second autodyne signal.

2. The method of claim 1, further comprising performing range gating on the autodyne signal.

3. The method of claim 1, wherein determining characteristics comprises processing the autodyne signal to identify a velocity associated with the subject medium from a peak frequency of the autodyne signal.

4. The method of claim 1, further comprising determining an intensity of the autodyne signal.

5. The method of claim 1, wherein determining characteristics comprises determining an air speed associated with an aircraft.

6. The method of claim 1, wherein determining characteristics comprises determining a ground speed associated with an aircraft.

7. The method of claim 1, wherein determining characteristics comprises identifying weather phenomena.

8. The method of claim 1, wherein generating an electromagnetic source beam comprises pulsing a laser.

9. The method of claim 1, wherein the subject medium comprises regions of atmosphere.

10. The method of claim 1, wherein the subject medium comprises regions of ground.

11. A non-transitory computer-readable storage medium having computer-executable instructions stored thereon which, when executed by a computer system, cause the computer system to:
   scan, in a first and a second direction, two diverging measuring beams transmitted from a single axicon lens across a subject medium;
   receive, from a light detection and ranging (LIDAR) system, an autodyne signal associated with the subject medium, wherein the autodyne signal combines two converging return signals reflected off of separate areas of the subject medium from the two diverging measuring beams;
   identify a peak frequency of the autodyne signal;
   determine a velocity associated with the subject medium from the peak frequency; and
   produce a two-dimensional image of the subject medium in angle and range based on the determined velocity associated with the subject medium.

12. The computer-readable storage medium of claim 11, wherein the computer system is further caused to identify atmospheric phenomena based on the velocity associated with the subject medium.

13. The computer-readable storage medium of claim 11, wherein the computer system is further caused to determine an airspeed associated with an aircraft from the velocity associated with the subject medium.

14. The computer-readable storage medium of claim 11, wherein the computer system is further caused to determine a groundspeed associated with an aircraft from the velocity associated with the subject medium.

15. The computer-readable storage medium of claim 11, wherein the computer system is further caused to perform range timing while receiving the autodyne signal.

16. The computer-readable storage medium of claim 15, wherein the range timing is used to determine an altitude associated with an aircraft.

17. A multifunction light detection and ranging (LIDAR) system comprising:
   a transmitter configured to generate an optical beam;
   an optical splitting axicon lens configured to generate two diverging measuring beams from the optical beam;
   a beam steering device configured at a first time to orient the two diverging measuring beams transmitted from the axicon lens in a first direction towards a subject medium and at a second time to orient the two diverging measuring beams transmitted from the axicon lens in a second direction toward the subject medium;
   a detector configured to receive an autodyne beam, wherein the autodyne beam combines two converging return beams generated by reflecting the two measuring beams off of separate areas of the subject medium; and
   a signal processor in electrical communication with the detector and configured to determine characteristics of the subject medium based upon the autodyne beam.

18. The multifunction LIDAR system of claim 17, wherein the characteristics comprises an air vortex or turbulence.

19. The multifunction LIDAR system of claim 17, wherein the characteristics comprises air or ground speed associated with an aircraft.

20. The multifunction LIDAR system of claim 17, wherein the characteristics comprises weather phenomena.

* * * * *